United States Patent
Gillis (12) 
(10) Patent No.: US 6,405,189 B1
(45) Date of Patent: Jun. 11, 2002

(54) METHOD AND APPARATUS FOR AMPLIFYING DESIGN INFORMATION INTO SOFTWARE PRODUCTS

(75) Inventor: Philip William Gillis, Whippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/182,493

(22) Filed: Oct. 30, 1998

(51) Int. Cl.[7] ................................................. G06F 3/00
(52) U.S. Cl. .................. 707/3; 707/1; 707/2; 707/203; 706/45
(58) Field of Search ............................... 707/203, 1, 2, 707/3, 505–508; 717/1; 706/45

(56) References Cited

U.S. PATENT DOCUMENTS

| | | | | |
|---|---|---|---|---|
| 5,327,568 A | * | 7/1994 | Maejima et al. ............. | 395/800 |
| 5,671,415 A | * | 9/1997 | Hossain ....................... | 395/701 |
| 5,835,712 A | * | 11/1998 | Dufresne ..................... | 707/501 |
| 5,873,097 A | * | 2/1999 | Harris et al. ................. | 707/203 |
| 6,192,367 B1 | * | 2/2001 | Schneck et al. .............. | 707/10 |

OTHER PUBLICATIONS

U.S. application No. 09/182,493, Thurlow et al., filed Jan. 1997.*

* cited by examiner

*Primary Examiner*—Kim Vu
*Assistant Examiner*—Cam-Y Truong (57) ABSTRACT

The software amplification system conveniently transforms design information stored in a database into desired software products. The system transforms the database in a manner specified by a control file. The control file is essentially a parameterized sample of the desired output, interspersed with control instructions that instruct how to manipulate the design data and create the desired object.

30 Claims, 6 Drawing Sheets

| Current State | Event | Next State | Event Action |
|---|---|---|---|
| idle | UserSelectSoda | Need75 | |
| Need75 | GotQuarter | Need50 | |
| Need50 | GotQuarter | Need25 | |
| Need25 | GotQuarter | idle | DispenseCan |

*FIG. 4*

REQUIREMENT: Soda Machine Operation Design

SUMMARY: This design defines the operation of a coin operated soda machine using /type of data/

FIELDS: /list of fields/

PROCESSING:

*FIG. 5*

REQUIREMENT: Soda Machine Operation Design

SUMMARY: This design defines the operation of a coin Operated soda machine using /type of data/

FIELDS: /list of fields/

PROCESSING:

\<control\> select all fields and records of database 60
\<control\> for all records in database     go from {current state} to {next state} upon {event} [ and {event action} ];

\<control\> next record
\<control\> end for all

FIG. 6

REQUIREMENT: Soda Machine Operation Design

SUMMARY: This design defines the operation of a coin operated soda machine using FSM symbology FIELDS: current stat; next state; event; event action

PROCESSING:

Go from idle to Need75 upon UserSelectSoda;
Go from Need75 to Need50 upon GotQuarter;
Go from Need50 to Need25 upon GotQuarter;
Go from Need25 to idle upon GotQuarter and DispenseCan;

```
Print #fd,  "REQUIREMENT: Soda Machine Operation Design"
Print #fd,  ""
Print #fd,  "   SUMMARY:  This design defines the operation of a coin"
Print #fd,  "   Operated soda machine using FSM symbology"
Print #fd,  ""
Print #fd,  "   FIELDS:   current state; next state; event; event action"
Print #fd,  ""
Print #fd,  "   PROCESSING:"

Set rs = database60.openrecordset (Open all fields and records of database 60)
do until rs.endOfRecords Print #fd, "  go from "; rs.currentState; " to "; rs.nextState;
               " upon "; rs.event;
    If rs.eventAction is not null then
        Print #fd, " and "; rs.eventAction; " ;"
        Endif
    rs.movement
Enddo
```

METHOD AND APPARATUS FOR AMPLIFYING DESIGN INFORMATION INTO SOFTWARE PRODUCTS

RELATED APPLICATIONS

The present application relates to application Ser. No. 09/182,637, entitled METHOD AND APPARATUS FOR STORING DATA AS LIQUID INFORMATION, filed on the same date by the same inventor as the subject application, and is hereby incorporated by reference in its entirety.

BACKGROUND OF THE INVENTION

1. Field of the Invention

The present invention relates to the construction of software products. More specifically, the invention relates to a system for conversion of stored design information into desired software products.

2. Description of the Related Art

Many software programs are based, in whole or in part, on an underlying type of design data such as message sets, Finite State Machines (FSMs), and rule based sets. Often this design data is not formally specified, but is hard-coded manually in a programming language that is compiled into machine code to be executed by a given processor and operating system. Design data or information is also specified in system requirements, documents or published standards, and is then translated by hand into source code for a specific application. Current practice requires that the reuse of information in a different application environment be accompanied by the difficult and expensive process of writing a new source code adapted to the new environment.

Design data or information can be defined as data that specifies the objects of a computer system environment, its properties and interconnections. Examples of objects include a block of code, a requirements document, a worldwide web (WWW) page, a design specification including information used only within the object, input/output interfaces, graphic user interface (GUI) pages, and hardware and software operating and maintenance procedures, such as diagnostics and system installation. Software objects used in a standard interface are applicable to a variety of applications because the object has no dependencies on a specific environment. A computer using the standard interface can therefore use design information for developing various objects or computer products if access to the information does not depend on a specific object or environment.

Design information can retain its usefulness for years extending across current and future environments. Design information can be reused in many ways throughout its life cycle and may cross numerous product releases and product lines. Therefore, its lifetime may be longer than any single product as it is adapted to changing technologies and requirements. Reuse of design information can facilitate faster delivery of high quality software, provide real-time synchronization between the production of requirements, documentation and software, and allow rapid response to an ever changing environment.

Stored design information can be easily adapted to a variety of uses. However, the present methods and techniques of reusing data compromise these advantages. The present day requirement for expensive human intervention to translate the design information into software products slows software development, impairs synchronization between the production of requirements, documentation and software, and slows the response to changes in the environment.

A need therefore exists to provide an automatic system for extracting stored design information from a design information database to assemble and format objects and software products using a minimum of manual intervention.

SUMMARY OF THE INVENTION

The present invention provides a software amplifier that converts stored design information to a desired format to produce a desired software product or object such as program code, source code, documentation, design diagrams, web pages, etc. According to a first preferred embodiment of the present invention, the software amplifier receives design information from a database as a first input, template information and control information as a second input, and a rules set as a third input. The template information is preferably a plain text parameterized sample of the desired object format and is stored in a control file. The control information is stored in the control file with the template information to direct the retrieval of desired design information from the database and shape the design information into an output according to instructions included in the control information. The rules set processes the control file and produces the desired object or software product based on the rules.

In a second preferred embodiment of the present invention, the software amplifier receives design information from a database as a first input, and a control file as a second input. The control file in the second embodiment is a computer program that includes the template information and control information formatted in a commercial programming language. The template information is preferably a plain text parameterized sample of the desired object format that is converted into print statements. The control information directs the retrieval of desired design information from the database and shapes the design information into an output according to instructions included in the control information. The control file is executed by the commercial programming language compiler to produce the desired object or software product.

BRIEF DESCRIPTION OF THE DRAWINGS

The invention will be described in detail with reference to the following drawings, wherein like numerals represent like element and.

DETAILED DESCRIPTION OF THE INVENTION

Figure 1:
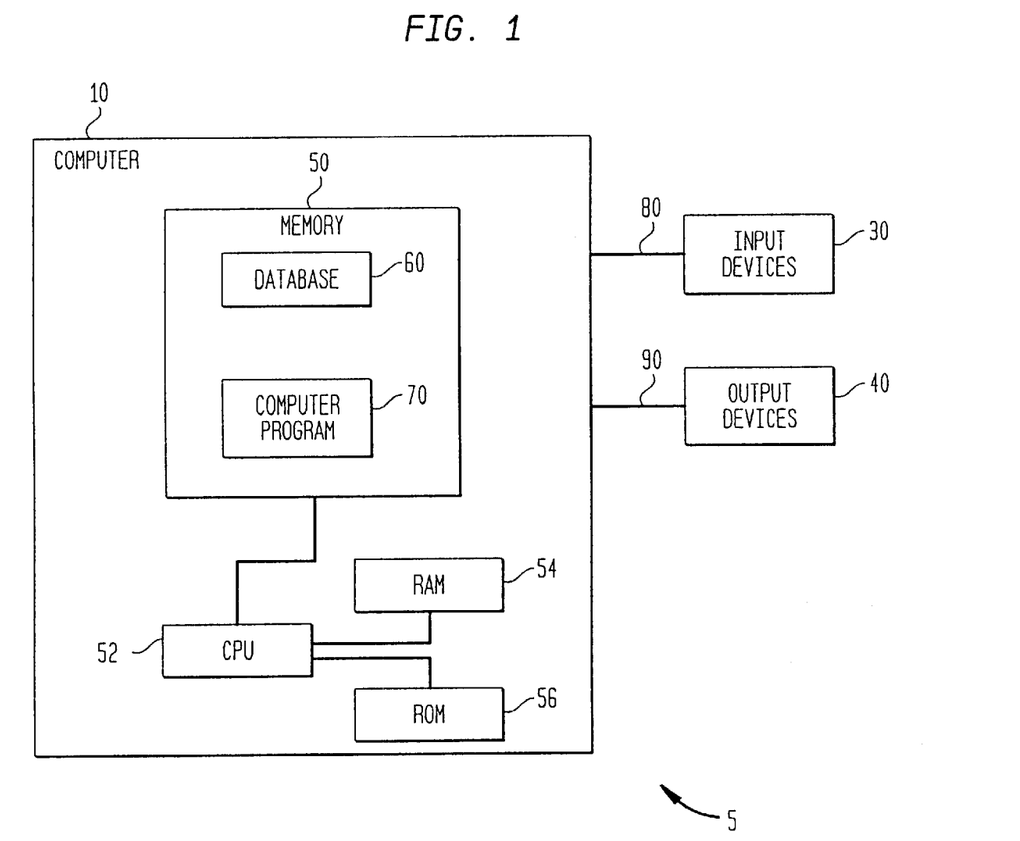
FIG. 1 illustrates a software amplification system according to a preferred embodiment of the invention.

FIG. 1 illustrates a design information storage system 5 according to the preferred embodiment of the present invention. The system 5 includes a computer 10, connected to input devices 30 and output devices 40. The computer 10 includes a central processing unit (CPU) 52 connected to a random access memory (RAM) 54, a read-only memory (ROM) 56 and a mass storage device 50. The input devices 30 allow human interaction with and data input to the computer 10. Accordingly, the input devices 30 include input components such as a keyboard, a mouse, a screen, a scanner, a disk drive, and other devices known for inputting data to the computer 10. The output devices 40 receive output data from the computer 10. The output devices 40 include but are not restricted to a printer and a screen. As an alternative, both the input devices 30 and the output devices 40 may be a modem, a network connection or off-line storage unit which communicates with the computer 10 via propagated signals 80 and 90.

A design information database 60 is stored in the mass storage device 50 which may be a hard disk, floppy disk, optical disk, etc. The memory 50 also stores a computer program 70 which instructs the computer 10 to perform the software amplification method according to the present invention when executed. In other words, whether loaded from the memory 50 or from the input devices 30 into the computer 10, the computer program 70 transforms the computer 10 into a special purpose machine that implements the invention. More particularly, each step of the inventive method transforms at least a portion of the computer 10 into a special purpose computer module implementing that step.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

Still further, the invention disclosed herein may take the form of an article of manufacture, such as a computer-usable medium, including a computer-readable program code embodied therein; wherein the computer-readable code causes the computer 10 to execute the inventive method.

The database 60 is relational or object oriented as understood by one skilled in the art, and stores the desired design information. The structure of the database 60 is designed in accordance with the type of input design information or in accordance with the anticipated uses of the information. The database 60 is preferably constructed using a commercially available database system such as Microsoft Access®.

The database 60 stores different types of design data such as message sets, Finite State Machines (FSMs), and rules based sets decoded from an input structure, such as a graphical design diagram, programming code, database entry form or requirement document, into a user-defined structure that is accessible for encoding into at least one different output structure, such as a graphical design diagram, programming code, database entry form or requirement document. A graphical design diagram is a drawing that represents design information. Example graphical design diagrams include flowcharts, procedural roadmaps, block diagrams, business diagrams, network diagrams, facilities management diagrams, and industrial process diagrams. A requirements document describes the design and operational characteristics, protocols, functionality and requirements of a system or product. Design data can be stored in the database 60 according to the related application Ser. No. 09/182,637, entitled METHOD AND APPARATUS FOR STORING DATA AS LIQUID INFORMATION, filed on the same date by the same inventor as the subject application, and hereby incorporated by reference in its entirety.

Figure 2:
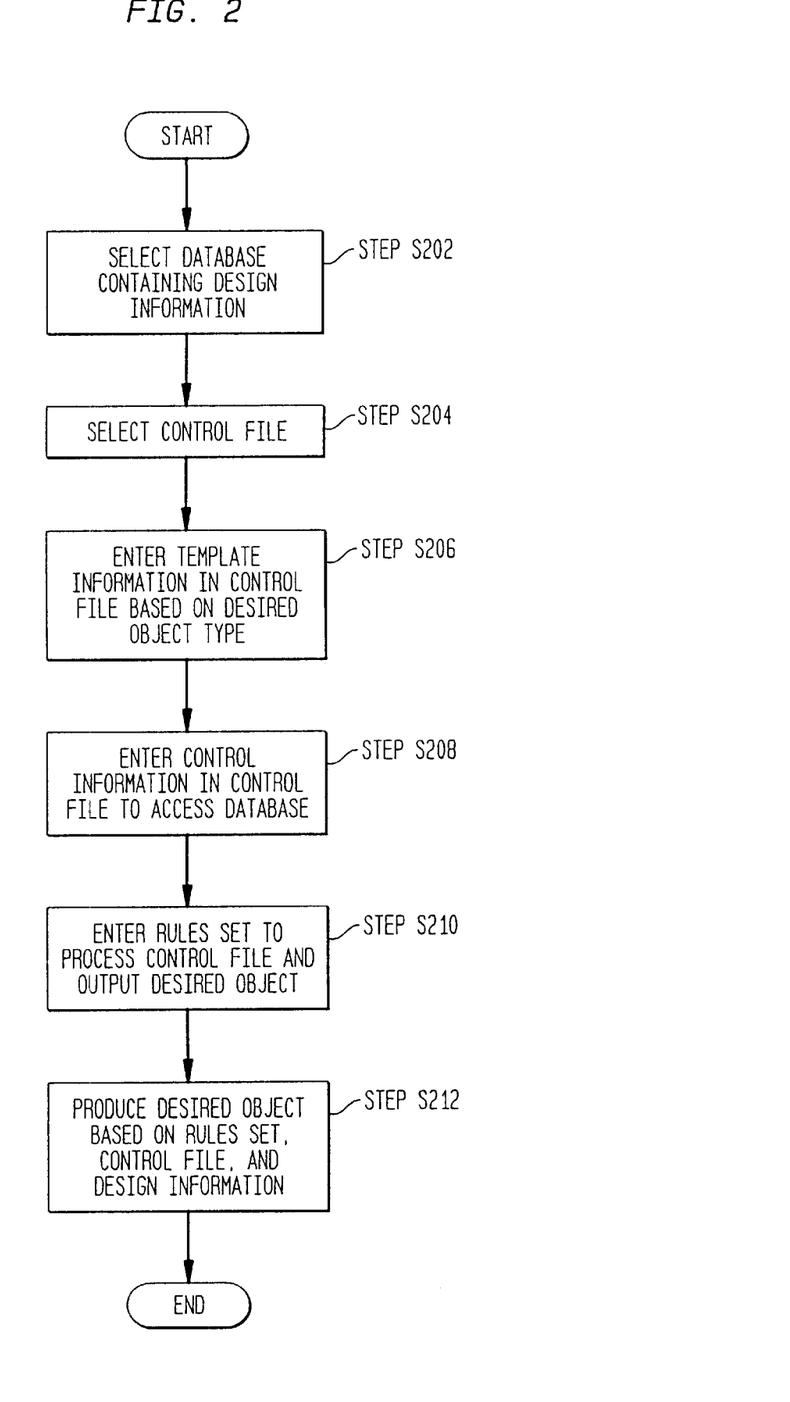
FIG. 2 is a flowchart illustrating the operation of a software amplification system according to a first embodiment of the present invention.

FIG. 2 illustrates the operation of the software amplification system according to a first embodiment of the present invention. At step S202, a user selects a database 60 in the memory 50 that stores the specific type of design information. That is, if the design information is in the form of a FSM, then the database 60 will have a structure specific to a FSM and include fields such as current state, next state, event, and an event action. Besides being stored in the memory 50, the database 60 could be input from one of the input devices 30 such as a disk drive, modem, network connection, or offline storage unit which communicates via a propagated signal 80.

At step S204, the user selects an empty control file. The control file defines how the design information in the database 60 is identified by the computer 10 so that the CPU 52 knows how and where to apply the database information. Template information and control information will be stored in the control file as described below. The information stored in the control file therefore depends on the specific object structure and the type of design data. For example, a FSM flow chart will have a different control file than a requirements document or even a FSM block diagram because the objects have different input structures. That is, a flow chart for a FSM graphical design diagram, for example, includes geometric shapes for every state, event and action that defines the operation listed in the geometric shape. However, a requirements document and block diagram generally do not use shapes for every state, event and action.

At step S206, the user enters template information specifically configured for both the database 60 and the type of output object desired. The template information is preferably plain text which is essentially a parameterized sample or template of the desired output. The template information is therefore format-specific information that is important to the arrangement of the object. If the desired object is a requirements document, then the template information includes fonts, tab settings, spacing, page numbers, paragraph numbers, page breaks, and text. If the object is a computer program, then the template information is format-specific information relating to comments, keywords, formatting, and language-specific characteristics of the code. If the objects is a graphics design diagram, then the template information is format-specific information such as the identification and location of the boxes, direction and length of the connecting lines, and page numbers. The template information also includes template variable names that corresponds to a specific value provided by control information, as described below.

At step S208, a user enters control information into the control file. The control information includes database queries to obtain and apply desired information stored in the database 60. Specifically, the control information includes instruction lines for advising the CPU 52 how to manipulate the design information in the database 60. The user enters the instruction lines generally at locations in the control file amongst the template information where the user wants the instruction lines to be executed. That is, if the user desires specific information from the database 60 to be entered between two lines of the template information stored in the control file, then the user enters the applicable database query instruction line between the two lines of template information. The instruction lines include well-known processing language commands such as if__then__else statements, do__until loops, do__while loops, for all loops, go to commands, begin and end commands, execute and store commands, stream manipulation commands, and data manipulation commands for one or several databases. Accordingly, the user can develop an individualized output as desired. One skilled in the art will readily appreciate from the forgoing that any well-known computer language could be adapted for use as the commands in the control information.

The database queries in the control information take the form of, for example, well-known database query language statements, whereby the appropriate information is retrieved from the database 60 as a query result. A query field name is an indicator to extract from the current record of the query result the specific design information contained in the database field corresponding to the field name. Consequently, when the control information includes a query field name, the query field name is filled with specific information extracted from the database 60 as the query field name is encountered. The control information also includes processing loops, thereby causing repeated processing of the database 60 until the queried fields are exhausted. In this way, the control file is able to direct the computer 10 to generate an object that is much larger than the control information.

At step S210, the user enters a rules set specifically configured to process the control file and output the desired object. The rules set is accessed by the CPU 52 to define how the template information and control information in the control file is identified by the computer 10 so that the CPU 52 knows what to output as the object. The rules set includes rules instructing the CPU 52 on how to recognize and process text, template variables, processing language commands and query field names to manipulate the design information in the database with respect to the control file.

At step S212, the CPU 52 applies the rules set to the control file to manipulate the database 60 and produce output in a format specified by the control file. If the line is a text line, then the line is output to the object in its textural form. If the text includes a template variable, then the computer 10 finds the rule in the rules file that recognizes the template variable and substitutes the corresponding text indicated by the rule into the template variable. If the line is a processing language command, then the computer 10 processes the command. If the line is a query field name, then the computer 10 extracts from the current record of the query result the specific design information contained in the database field corresponding to the field name. The rules set can be created by the user for the particular control file, or the rules set can be stored and selected by the user. If the user selects the previously stored rules set, then the user can edit the stored rules set as desired for the particular control file.

Figure 3:
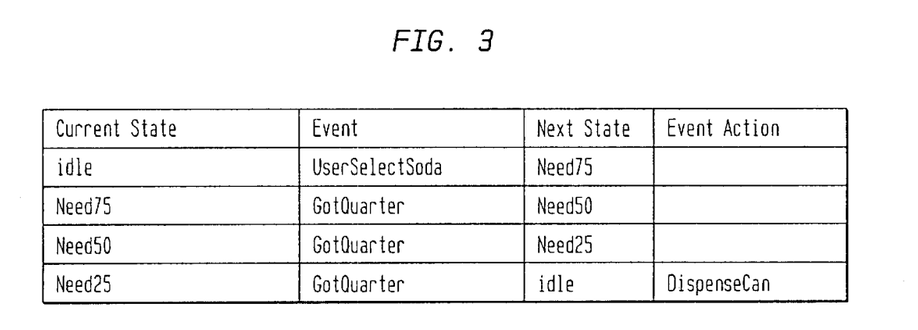
FIG. 3 illustrates a database that stores design information.

The operation of the present invention will now be described in detail with reference to specific examples of preferred embodiments. FIG. 3 illustrates a design information database 60 storing design information using the terminology of the well-known finite state machine (FSM) symbology. Accordingly, the design information is expressed as a series of states, events and event actions. The design information stored in the database 60 includes the states, events, and event actions of a soda machine operation design.

The fields of the database 60 are "current state", "event", "next state", and "event action". The "current state" field identifies the placement of standing within a process at a given instance. The "next state" field identifies the following placement of standing. The "event" field identifies the condition required to shift from the "current state" to the "next state." The occurrence of an event from a specific state may also trigger an action identified in the "event action" field.

As shown in step S202, the user selects database 60, which, according to FIG. 3, has design information stored therein. The design information in the database 60 will be output in a requirements document, as shown below.

Figure 4:
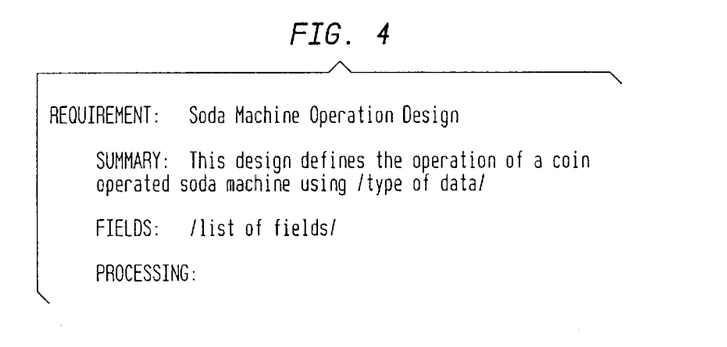
FIG. 4 is an example control file for an excerpt of a requirements document with template information according to the present invention.

As shown in steps S204 and S206, the user opens an empty control file and enters template information therein to instruct the computer 10 how to format the desired object. The user could also select a control file having template information previously stored therein. For example, the user might enter a control file having template information as shown in FIG. 4, which is the template information of a requirements document for describing the operation design of a soda machine. The template information contains format-specific information that shows the paragraph breaks, fonts, tab settings and spacing of the desired object. The format of the template information is particular to the type of object displayed, but is not specific to the type of information used in the object. That is, the requirements document template is different than a graphical design diagram template, but could provide the format for a different type of design information such as message sets and rules based sets, or design data based on FSM symbology.

Figure 5:
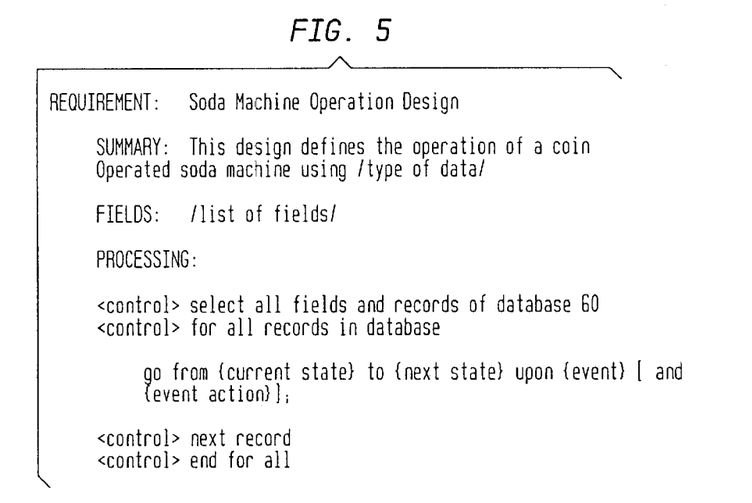
FIG. 5 is the example control file of FIG. 4 including control information according to the first embodiment of the present invention.

As shown in step S208, a user enters control information into the control file. FIG. 5 illustrates the example control file with the template information as shown in FIG. 4 and with user added control instructions identified by a "<control >" keyword. The user enters the control information in the control file where the user wants the control information to be executed. That is, the user intermixes the control information with the template information, so that, upon execution of the control file, the control information and template information are processed in the order they are accessed. The control information is stored in the control file to direct the retrieval of desired design information from the database. In FIG. 5, the control information will instruct the CPU 52 to select all the fields and records of database 60, and for all of the records, to output the text "go from", "to", "upon", and "and", along with the design information obtained by the database queries listed within the { } indicators. In this example, the control information is located at the end of the control file following the template information, so that the control information is executed after the template information is executed. However, the user can enter the control information in the control file where the user wants the control instruction to be executed.

Figure 6:
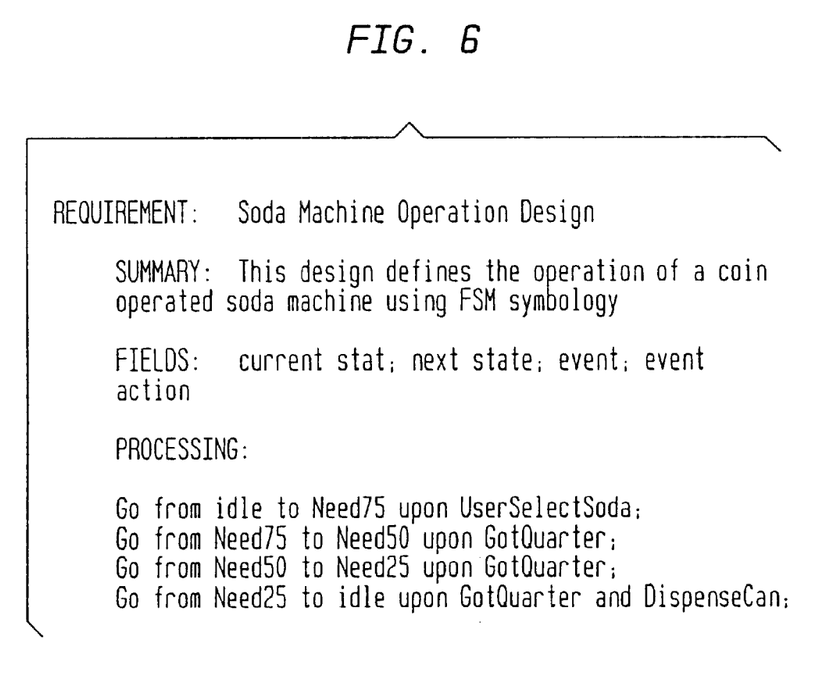
FIG. 6 is an example requirements document object based on the control files shown in FIGS. 5 and 8.

As shown in step S210, a user enters a rule set to execute the control file and produce the desired object based on the rules. For example, a user might enter the following rules to instruct execution of the control file listed in FIG. 5 to produce a requirements document:

(Rule 1) apply rules 2–11 to each line of control file (Rule 2) Output text to output device or storage device (Rule 3) Recognize data in { } as database field (Rule 4) Recognize data in / / as template variable (Rule 5) Recognize [ ] as text to output if data in { } exists (Rule 6) Recognize "select" as access indicated portion of database (Rule 7) Recognize "for all" as process loop while condition true (Rule 8) Recognize "end for all" as end of loop (Rule 9) Recognize "next record" as go to next record of database (Rule 10) Recognize /type of data/ as "FSM symbology"
(Rule 11) Recognize /list of fields/ as "current state; next state; event; event action"
(Rule 12) Recognize <control> as control instruction line As shown in step S212, the CPU 52 applies the above rules set to the control file of FIG. 5 to manipulate the database 60 and produce an object in the format specified by the control file. Based on Rules 1 and 2, the computer 10 begins creating the object by outputting the first line of text in the control file beginning with "REQUIREMENT:" to the output device 40 as shown in FIG. 6. Based on Rules 1 and 2, the computer 10 outputs the next line of text beginning with "SUMMARY:" to the output device 40. Based on Rules 1, 2, 4, and 10, the computer 10 substitutes "FSM symbology" for /type of data/ in the following line of text and outputs that line of text to the output device 40. Based on Rules 1, 2, 4, and 11, the computer 10 inserts text "current state; next state; event; event action" in place of /list of fields/, and outputs the line of text to the output device 40. Based on Rules 1 and 2, the computer 10 outputs the text "PROCESSING:" to the object.

Based on Rules 1, 6 and 12, the computer 10 opens all fields and records of the database 60. Based on Rules 1, 2, 3 and 7, the computer 10 processes the lines within the "for all" loop and outputs the next lines of the object by (1) outputting "go from", (2) obtaining the first or next record in the "current state" field of database 60, (3) outputting that record, (4) outputting "to", (5) obtaining the record in the "next state" field of the database 60 associated with the record obtained from the "current state" field, (6) outputting the obtained record, (7) outputting "upon", (8) obtaining the record in the "event" field of the database 60 associated with the record obtained from the "current state" field, and (9) outputting this record. Based on Rules 1, 3 and 5, the computer 10 does not output text "and" because no data exists in the data field event action. Based on Rules 1, 8 and 12, the computer 10 goes to the next record of the database 60, and returns to the for all control instruction line and proceeds to process the control instruction lines.

Continuing processing in this manner, eventually the last record of database 60 is reached. Based on Rules 1, 2 and 3, the computer 10 forms and outputs the next line of the object as shown in FIG. 6 by (1) outputting "go from", (2) obtaining the last record in the "current state" field of database 60, (3) outputting that record, "Need 25", (4) outputting "to", (5) obtaining the last record in the "next state" field of the database 60, (6) outputting the obtained record, "idle", (7) outputting "upon", (8) obtaining the last record in the "event" field of the database 60, and (9) outputting this record, "GotQuarter". Based on Rules 1, 2, 3 and 5, the computer 10 outputs "and", obtains the last record in the "event action" field of the database 60, and outputs this record ,"DispenseCan". Based on Rules 1, 8, 9 and 12, the computer 10 exits the control file because no database records remain unprocessed.

The template information and control information that make up the control file and the rule set only need to be designed once for this type of design information and structure. That is, once the control file of FIG. 5 and the rule set discussed above are produced, the computer 10 can manipulate database 60 or any other similarly structured database to create a requirements document from the design information stored in the database. This provides the benefit of assembling and formatting objects by providing a database 60 having new format independent design information and therefore allows the user to produce software objects using minimal manual intervention.

The desired information from database 60 is manipulated into a type of pseudocode in the created requirements document page. It is readily appreciated that the design information from the database 60 could be converted into a program language such as Pascal, Fortran, C/C++, Lisp, Basic, etc. simply by applying a different user created control file. The program languages are therefore another object or software product that can be assembled and produced by the present invention.

Figure 7:
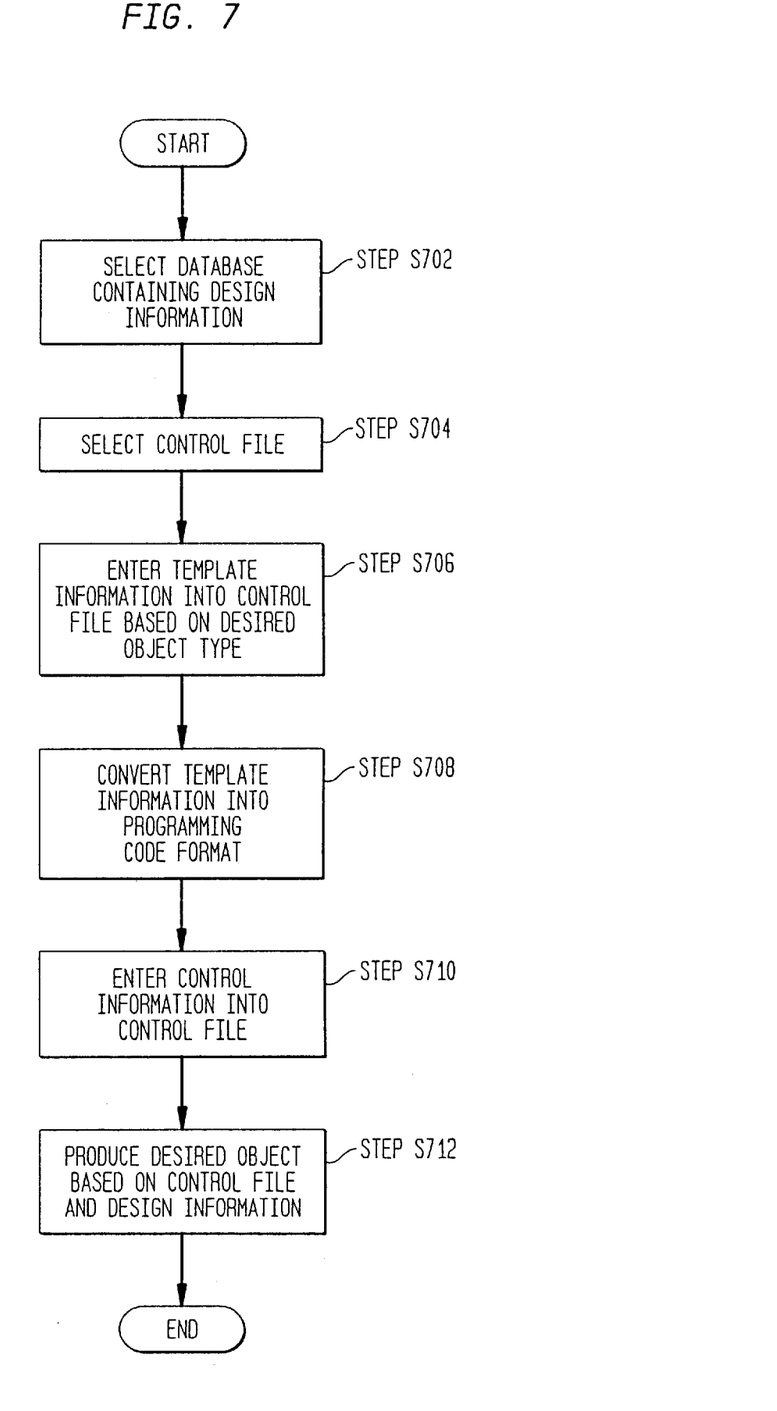
FIG. 7 is a flowchart illustrating the operation of a software amplification system according to a second embodiment of the present invention.

The second embodiment of the present invention will now be described for producing an object from the database 60. FIG. 7 illustrates the operation of the software amplification system according to a second embodiment of the present invention. Steps S702–706 are identical to steps S202–S206 of the first embodiment of the present invention, as discussed above with respect to FIG. 2. Therefore, at step S702, a user selects a database 60 in the memory 50 that stores the specific type of design information. At step S704, the user selects an empty control file that defines how the design information in the database 60 is identified by the computer 10 so that the CPU 52 knows how and where to apply the design information stored in the database 60. At step S706, the user enters template information specifically configured for both the database 60 and the type of output object desired.

At step S708, the user converts the template information stored in the control file into programming code format. Specifically, the user converts the plain text into programming code by inserting print commands before the lines of text. The print commands are formatted in a specific programming format for recognition by a commercial language compiler as print commands.

At step S710, the user enters control information into the control file. The control information includes database queries to obtain and apply desired information stored in the database 60 in a similar format as the control information of the first embodiment described above in regards to step S208 of FIG. 2. In other words, the control information includes instruction lines for advising the CPU 52 how to manipulate the design information in the database 60. However, in contrast to the control information of the first embodiment, the control information entered in step 710 is structured in the format of a commercial programming language. This provides the user with the benefit of the full capabilities of the underlying standard programming language. Accordingly, the available instruction lines of the control information can include all of the available commands and functionality of the standard programming language. The database queries and control information is entered in the form of well-known database query language statements in a similar manner as the database queries are structured for the first embodiment of the present invention as described above and in relation to step S208. Consequently, the well-known compiler for the standard programming language may need to be modified to handle the functionality of these additional statements. After step S710 is completed, the control file is in the format of a control program written in the desired standard programming language.

At step S712, the computer 10, produces the desired object based on the control file and the design information. The control file is compiled by the standard program language compiler modified as discussed above and is executed by the CPU 52 to produce the object.

The operation of the present invention will now be described in detail with reference to a specific example of the second embodiment. The example is similar to the specific example of the first embodiment described above, and provides a control file that retrieves design information from the database 60 and produces as the object the excerpt of the requirements document illustrated in FIG. 6.

As shown in step S702, the user selects database 60, which, according to FIG. 3, has design information stored therein. As shown in steps S704 and S706, the user opens an empty control file and enters template information therein to instruct the computer 10 how to format the desired object. Steps S702, S704, and S706 are generally the same steps as S202, S204, and S206 discussed above with respect to FIG. 2.

Figure 8:
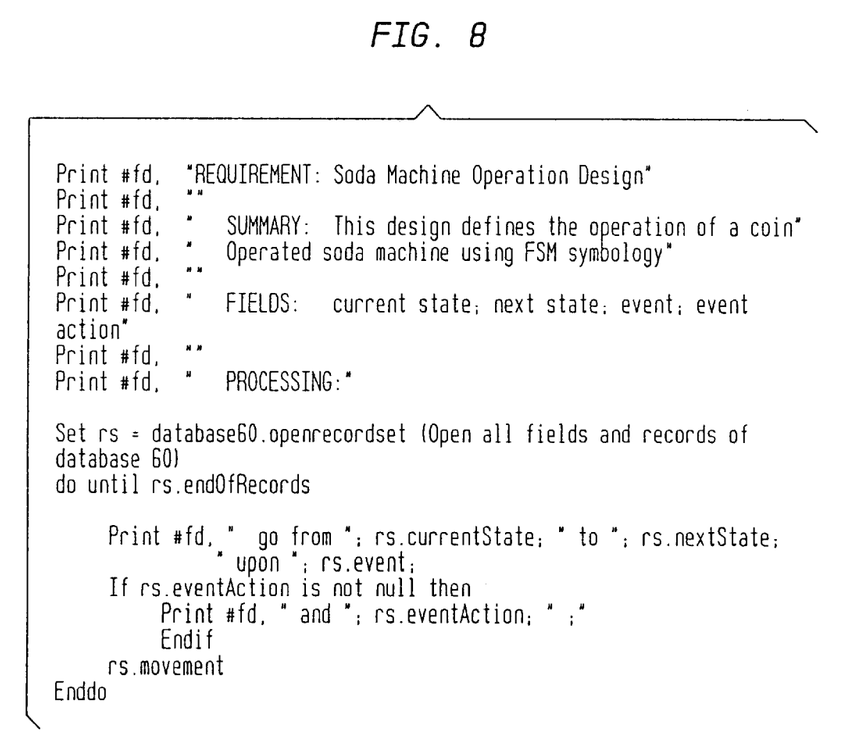
FIG. 8 is an example control file including control information according to the second embodiment of the present invention.

At step S708, the user converts the template information into programming code format. The user converts the template information into the programming code format by converting the text only lines of the template information into print statements in the format of the standard programming language used to provide the control information. The print statement is formatted as required by the applied standard programming language. That is, each line of text is preceded by a "Print" statement in the format of the programming language. Upon reading the print statements, the computer 10 prints the text to the output object. FIG. 8 illustrates an example of the converted template information at the first 8 lines of a control file. FIG. 8 is an example control file written in Visual Basic programming language including control information according to the second embodiment of the present invention. In FIG. 8, the first 8 lines of text are preceded by "Print" statements to instruct computer 10 to print the lines of text.

At step S710, the user enters the control information into the control file. In FIG. 8, the control information includes the non-textual instructions "Print #fd" "set rs", "do until", "If" and "move next" for instructing the CPU 52 how to manipulate the design information in the database 60. File descriptor #fd identifies an output object file. Record set rs identifies the selected database 60. The control information for this example is written in Visual Basic programming language, but could be written in other well-known standard programming languages, such as Pascal, Fortran, C/C++, Lisp and SQL, to control the interaction with the database 60 and output the desired object.

As shown in step S712, the control file is executed by the CPU52 using the standard programming language. The CPU52 processes each line of the control file to form the object. Based on the print commands, the computer 10 outputs the first 8 lines of text, which includes blank lines of text. Based on the set command, the computer 10 selects and opens all fields and records of the database 60. Based on the do_until command, the computer 10 executes the program code within the loop for all the records of the database 60. The computer 10 (1) prints "go from", (2) obtains the first or next record of the "current state" field of database 60, (3) outputs that record, (4) prints "to", (5) obtains the record in the "next state" field of the database 60 associated with the record obtained from the "current state" field, (6) outputs the obtained record, (7) prints "upon", (8) obtains the record in the "event" field of the database 60 associated with the record obtained from the "current state" field, and (9) outputs this record. If the record in the "event action" field of the database 60 has information stored therein, then the computer 10 outputs "and", obtains the record in the "event action" field of the database 60 associated with the record obtained from the "current state" field, and output the record. However, for the first three records of the database 60, the computer 10 does not output the text "and" because no data exists in the "event action" field.

The computer 10 then executes the commands in the do_until loop for the next record and continues processing in this manner for all of the records.

While the method of converting database design information into usable formats has been described with respect to design information expressed in FSM symbology and conversion into a requirements document, the method of the present invention is not limited to these forms of expression, or the databases and control files explained in association therewith. Instead, one skilled in the art would readily appreciate from the foregoing disclosure how to develop documentation and code objects from FSMs, message sets or rule based sets stored in a database. The documentation and code objects include at least programming code, a requirements document, a WWW page, a design specification, input/output interfaces, GUI pages, and hardware and software operating and maintenance procedures.

It will also be understood that the steps of the invention can be implemented in different orders. That is, step S202 can be executed before step S204, before step S206, before step S208 or before step S210 because the retrieval of the database 60 is executed independently of the formation of the control program. In the same manner, step S702 can be executed before any one of steps S704, S706, S708, S710 or S712. In addition, the user can create a new control file or select a previously created and stored empty control file, and enter template information into the control file, as described for steps S204 and S206, or the user can input a previously created applicable control file having the template information already stored therein. Further, the template information and control information can be created and then stored into a control file.

It should be apparent from the aforementioned description and attached drawings that the concept of the present application may be readily applied to a variety of preferred embodiments including those described herein. Accordingly, the scope of the invention described in the instant application should be limited solely by the appended claims.

What is claimed is:

1. A method for retrieving design information from a database and producing an object from the database information, comprising the steps of:
    (a) accessing a database having design information, the database format structured for a type of design information;
    (b) providing template information representing a parameterized sample of a desired object;
    (c) providing control information designating the design information to be retrieved from the database;
    (d) producing a desired object based on the parameterized sample, the control information and the design information; and
    (e) providing rules for processing the control information and template information;
    wherein the step (d) produces the desired object based on the rules, the modified parameterized sample, the control information and the design information.

2. The method of claim 1, wherein
    the step (b) provides template information including text and keywords representing the parameterized sample of the object, the keywords indicating placement of specific text, and
    the step (e) replaces the keywords with the specific text.

3. The method of claim 1, wherein the type of design information includes one of message sets, Finite State Machines, and rules based sets.

4. The method of claim 1, wherein the object is one of documentation, pseudo code, program code, and hardware and software maintenance procedures.

5. The method of claim 1, wherein the step (b) provides previously stored template information representing the parameterized sample of the desired object.

6. The method of claim 1, wherein the step (c) provides previously stored control information designating the design information to be retrieved.

7. The method of claim 1, wherein the step (b) includes the step of receiving user input specifying the template information.

8. The method of claim 1, wherein the step (c) includes the step of receiving user input specifying the control information.

9. The method of claim 1, further comprising (f) converting the template information into programming code.

10. The method of claim 1, wherein the template information is formatted in programming code.

11. An apparatus for amplifying design information into software products comprising:

a memory device having a database structured for storing a type of design information; at least one input device for inputting or specifying template information representing a parameterized sample of a desired object, and for inputting or specifying control information designating the design information to be retrieved from the database; and a processor accessing the database, accessing the template information, accessing the control information, and producing a desired object based on the parameterized sample, the control information and the design information;

wherein the processor accesses rules for processing the control information and template information, and produces the desired object based on the rules, the modified parameterized sample, the control information and the design information.

12. The apparatus of claim 11, wherein the processor accesses template information including text and keywords representing the parameterized sample of the object, the keywords indicating placement of specific text, and the processor replaces the keywords with the specific text.

13. The apparatus of claim 11, wherein the type of design information includes one of message sets, Finite State Machines, and rules based sets.

14. The apparatus of claim 11, wherein the object is one of documentation, pseudo code, program code, and hardware and software maintenance procedures.

15. The apparatus of claim 11, wherein the processor accesses previously stored template information representing the parameterized sample of the desired object.

16. The apparatus of claim 11, wherein the processor accesses previously stored control information designating the design information to be retrieved.

17. A computer program embodied on a computer-readable medium for producing an object from database information, comprising:

a first accessing source code segment for accessing a database having design information, the database format structured for a type of design information;

a second accessing source code segment for accessing template information representing a parameterized sample of a desired object;

a third accessing source code segment for providing control information designating the design information to be retrieved from the database;

a fourth accessing source code segment for accessing rules for processing the control information and template information; and a producing source code segment for producing a desired object based on the parameterized sample, the control information and the design information;

wherein the producing source code segment produces the desired object based on the rules, the modified parameterized sample, the control information and the design information.

18. The computer program of claim 17, wherein the second accessing source code segment accesses template information including text and keywords representing the parameterized sample of the object, the keywords indicating placement of specific text, and the producing source code segment replaces the keywords with the specific text.

19. The computer program of claim 17, wherein the type of design information includes one of message sets, Finite State Machines, and rules based sets.

20. The computer program of claim 17, wherein the object is one of documentation, pseudo code, program code, and hardware and software maintenance procedures.

21. The computer program of claim 17, wherein the second accessing source code segment accesses previously stored template information representing the parameterized sample of the desired object.

22. The computer program of claim 17, wherein the third accessing source code segment accesses previously stored control information designating the design information to be retrieved.

23. The computer program of claim 17, wherein the template information is formatted in programming code.

24. A computer data signal for producing an object from database information, comprising:

a first accessing signal segment for accessing a database having design information, the database format structured for a type of design information;

a second accessing signal segment for accessing template information representing a parameterized sample of a desired object;

a third accessing signal segment for providing control information designating the design information to be retrieved from the database;

a fourth accessing signal segment for accessing rules for processing the control information and template information; and a producing signal segment for producing a desired object based on the parameterized sample, the control information and the design information;

wherein the producing signal segment produces the desired object based on the rules, the modified parameterized sample, the control information and the design information.

25. The computer program of claim 24, wherein the second accessing signal segment accesses template information including text and keywords representing the parameterized sample of the object, the keywords indicating placement of specific text, and the producing signal segment replaces the keywords with the specific text.

26. The computer program of claim 24, wherein the type of design information includes one of message sets, Finite State Machines, and rules based sets.

27. The computer program of claim 24, wherein the object is one of documentation, pseudo code, program code, and hardware and software maintenance procedures.

28. The computer program of claim 24, wherein the second accessing signal segment accesses previously stored template information representing the parameterized sample of the desired object.

29. The computer program of claim 24, wherein the third accessing signal segment accesses previously stored control information designating the design information to be retrieved.

30. The computer program of claim 24, wherein the template information is formatted in programming code.

* * * * *